United States Patent

[11] 3,582,972

[72] Inventor Jean Terrier
Orsay, France
[21] Appl. No. 744,979
[22] Filed July 15, 1968
[45] Patented June 1, 1971
[73] Assignee Compagnie Generale D'Electricite
Paris, France
[32] Priority July 13, 1967, Mar. 28, 1968
[33] France
[31] 114396 and 145,976

[54] HIGH-SPEED PULSE COUNTER
10 Claims, 9 Drawing Figs.

[52] U.S. Cl. .......... 307/221, 307/286, 307/322

[51] Int. Cl. .......... G11c 19/00

[50] Field of Search .......... 307/286, 221

[56] References Cited

UNITED STATES PATENTS

| | | | |
|---|---|---|---|
| 3,121,176 | 2/1964 | Burns et al. | 307/286 |
| 3,152,264 | 10/1964 | Ergott et al. | 307/286 |
| 3,185,863 | 5/1965 | Sear | 307/286 |
| 3,376,430 | 2/1968 | Smith | 307/286 |

*Primary Examiner*—Donald D. Forrer
*Assistant Examiner*—Harold A. Dixon
*Attorney*—Sughrue, Rothwell, Mion, Zinn & MacPeak

ABSTRACT: High speed tunnel-diode counter constructed in successive stages and connected to assure a change of pulse polarity at each stage, the necessary condition for best operation.

INVENTOR
JEAN TERRIER

BY
Sughrue, Rothwell, Mion, Zinn & Macpeak
ATTORNEYS

INVENTOR
JEAN TERRIER
BY
Sughrue, Rothwell, Mion, Zinn & Macpeak
ATTORNEYS

INVENTOR
JEAN TERRIER
BY
Sughrue, Rothwell, Mion, Zinn & Macpeak
ATTORNEYS

INVENTOR
JEAN TERRIER

BY
Sughrue, Rothwell, Mion, Zinn & Macpeak
ATTORNEYS

INVENTOR
JEAN TERRIER

BY

Sughrue, Rothwell, Mion, Zinn & Macpeak
ATTORNEYS

HIGH-SPEED PULSE COUNTER

BACKGROUND OF THE INVENTION

1. Field of the Invention

The present invention relates to a pulse counter comprising successive stages which is designed to be able to operate at high speed under excellent conditions of reliability, for example a counter of which each stage is formed by the association of two tunnel diodes or the like.

2. Description of the Prior Art

The use of binary flip-flops having two-tunnel diodes in high-speed pulse counters is well known. Such a flip-flop is known comprising a system of two arms in parallel, one formed of two tunnel diodes in series and the other formed of two equal resistances in series, with an inductance between the point common to the resistances and the point common to the tunnel diodes, this system having a lower end connected to ground and an upper end connected to a unidirectional source through a third resistance.

It is known to connect such identical stages in cascade through a series resistance-capacitance differentiating circuit inserted between the point common to the tunnel diodes of one stage and the upper end of the aforesaid system, with pulses acting on each stage with the same polarity for all the stages.

This arrangement is disadvantageous at high speeds for the following reason.

It will be assumed by way of example that the flip-flop pulses are positive. There will be collected at the output of any stage a positive-going edge triggered by a positive pulse and then a negative-going edge, and so on. The differentiating circuit derives from such a positive-going edge a positive pulse which changes over the next stage, and so on. On the other hand, the differentiating circuit derives from each negative-going edge a negative pulse which has no effect. It is by this well-known process that a division by two takes place at each stage.

Now, a careful study of the pulse edges by means of an oscilloscope has shown that a positive-going edge triggered by a positive pulse does not have a straightforward form. It has a first positive peak followed by a negative peak and thereafter by a positive level section. This is because the input pulse is immediately repeated in the output current, the triggering taking place only thereafter. There consequently results from the differentiation, not a single pulse, but two pulses side-by-side, each of low amplitude. The succeeding stage is therefore acted on under defective conditions.

On the other hand, a negative-going edge triggered by a positive input pulse has a straightforward form, because the edge is preceded by a small positive kink whose negative-going edge is followed by a triggering edge which then has no further irregularity. By derivation of such a quasi-rectilinear edge, there is obtained for the succeeding stage a single pulse of satisfactory amplitude.

Of course, equivalent effects are encountered in the case of an action by negative pulses. They are of such nature as to limit the operating frequency of a counter comprising tunnel-diode flip-flops.

SUMMARY OF THE INVENTION

The invention has for its object to provide a tunnel-diode counter arrangement which does not suffer from this limitation and which is capable of operating correctly at increased speed.

In accordance with the invention, in a high-speed counter comprising a number of stages in cascade, each of which comprises a flip-flop having two tunnel diodes in series, the stages of one parity have a first structure receiving a triggering pulse of a first polarity and emitting a triggering pulse of the opposite polarity, while the stages of the other parity have a second structure receiving a triggering pulse whose polarity is opposite to the first polarity and emitting a triggering pulse of the said first polarity.

In accordance with a further feature, in a high-speed counter comprising stages formed with tunnel diodes in cascade, one stage comprises in series a trigger having two tunnel diodes in series and an inverting arrangement, all the stages being identical.

BRIEF DESCRIPTION OF THE DRAWINGS

The invention will be described by way of example in greater detail by means of one embodiment with reference to the accompanying drawings, in which:

FIG. 1*a* shows a succession of positive triggering pulses. These pulses are applied to a flip-flop comprising tunnel diodes which have at their common point alternatively low level sections *g* and high level sections *h* shown in FIG. 1*b*, separated by alternately positive-going and negative-going edges. A positive-going edge has a small kink *x* halfway along the edge, which gives by differentiation FIG. 1*c* a small double positive $j_1$. On the other hand, a negative-going edge first of all has a small initial end peak W, followed by a quasi-rectilinear descent over its entire extent. Differentiation in FIG. 1*c* consequently results in a negative pulse of relatively large amplitude $j_2$.

FIG. 2*a* shows a succession of negative triggering pulses, and FIGS. 2*b* and 2*c* graphs, equivalent to the graphs of FIGS. 1*b* and 1*c* with polarity reversal. A negative triggering pulse supplies a quasi-rectilinear positive-going edge beginning with a small negative peak W′, which supplies on differentiation a positive pulse $j'_2$ of appreciable amplitude, while the negative-going edge supplies on differentiation a small double negative pulse $j'_1$. Since the single large pulses $j_2$, $j_2$ are sufficient in themselves, triggering pulses of alternate polarity can consequently be applied with advantage to the successive stages of a counter comprising tunnel-diode flip-flops.

FIG. 3*a* is a current-voltage curve of a tunnel diode forming part of a flip-flop comprising two tunnel diodes, the diagram of which is shown in FIG. 3*b*.

Figure 1:
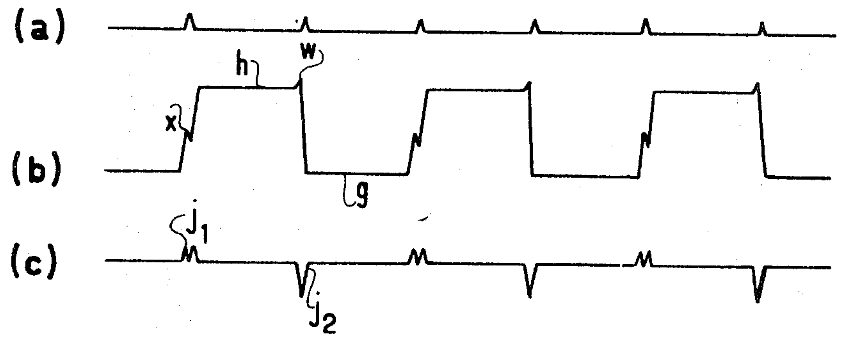
FIGS. 1 and 2 show a number of curves explaining the basic principle of the invention.
Figure 2:
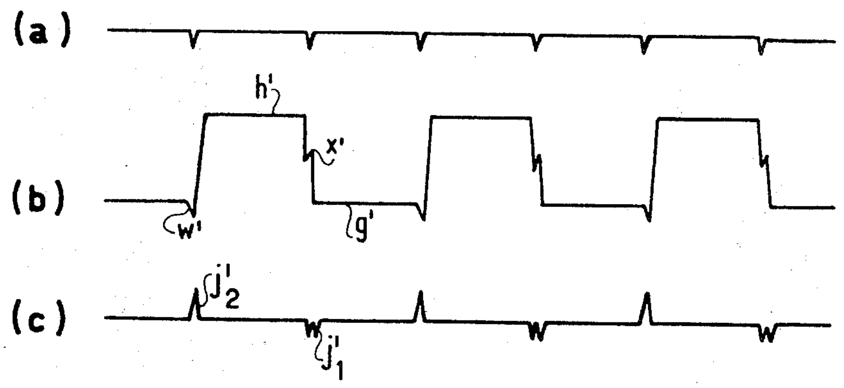
Figure 3A:
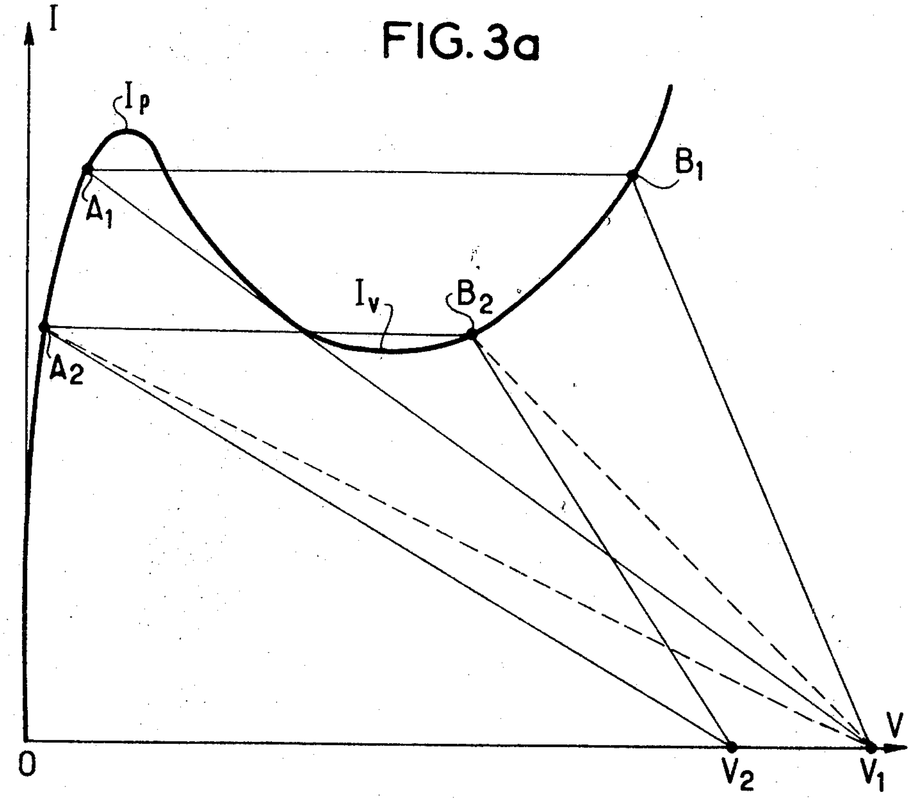
FIGS. 3*a* and 4*a* are curves referring to known circuits illustrated in FIGS. 3*b* and 4*b*, from which the principle of the operation of the arrangement according to the invention may be understood.

The curve has a "peak current" maximum $I_p$ and a "valley current" minimum $I_v$ (FIG. 3*a*).

It will be assumed that in a first type of operation, called strong bias current operation, and for tunnel diodes whose peak current is 4.7 mA, for a supply voltage $V_1$=+0.6 V, with $R_3$=27 and $R_1$=$R_2$100Ω, all these values naturally being given by way of illustration and having no limiting character, the figurative point of the diode $D_1$ is at $A_1$ (low voltage) and the figurative point of the diode $D_2$ is at $B_1$ (high voltage). These two points are on a horizontal, because in the inoperative position the same current passes through the two assemblies, $R_1$ and $D_1$ in parallel on the one hand, and $R_2$ and $D_2$ on the other hand. The corresponding current value is in the neighborhood of the peak current $I_p$. For a positive input pulse supplied to the high point of P of the circuit through a capacitor C, transmitted to the diode $D_1$ through the inductance L, the diode $D_1$ exceeds the point $A_1$ in the neighborhood of $I_p$ and its state changes to $B_1$, which results in a change of the state of $D_2$ from $B_1$ to $A_1$ owing to the memory effect of the inductance L. An exchange takes place between $D_1$ and $D_2$. For a further positive pulse arriving at P, $D_2$ returns to $B_1$ and $D_1$ to $A_1$, and so on.

It will now be (low that, in a second type of operation, called low bias current operation, for a positive supply voltage equal to $V_1$=+0.6 with $R_3$=68Ω and $R_1$=$R_2$100Ω, for example, the figurative point of the diode $D_1$ is at $A_2$ (low voltage) and the figurative point of the diode $D_2$ is at $B_2$ (high voltage). The corresponding current value is in the neighborhood of the valley current. For a negative input pulse applied to the point P, the diode $D_1$ passes below the point $A_2$ in the neighborhood of $I_r$ and reaches $B_2$, which results in a change of $D_2$ from $B_2$ to $A_2$. For a further negative pulse arriving at P, $D_2$ returns to $B_2$ and $D_1$ to $A_2$, and so on. This same result may advantageously be obtained by taking a positive voltage $V_2$ different from $V_1$, for example $V_2$=+0.5 V, and a series resistance $R_3$=47Ω.

Figure 3B:
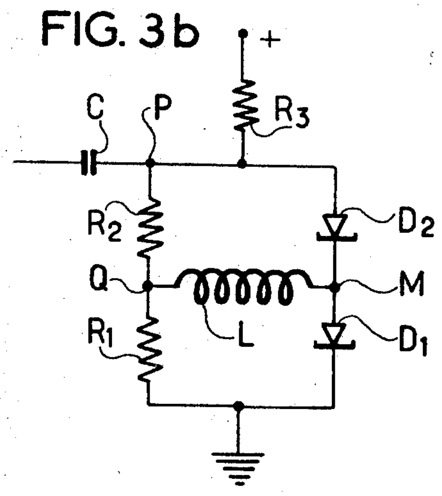
FIG. 3*b* is a diagram of a known flip-flop comprising two tunnel diodes $D_1$ and $D_2$ of like type in series, two equal resistances $R_1$, $R_2$ in series with each other and in parallel with the tunnel diodes, and an inductance L between the common point Q of the resistances and the common point M of the tunnel diodes. The network containing the tunnel diodes is connected on the one hand to ground and on the other hand to a positive voltage source through a resistance $R_3$.
Figures 4A, 4B:
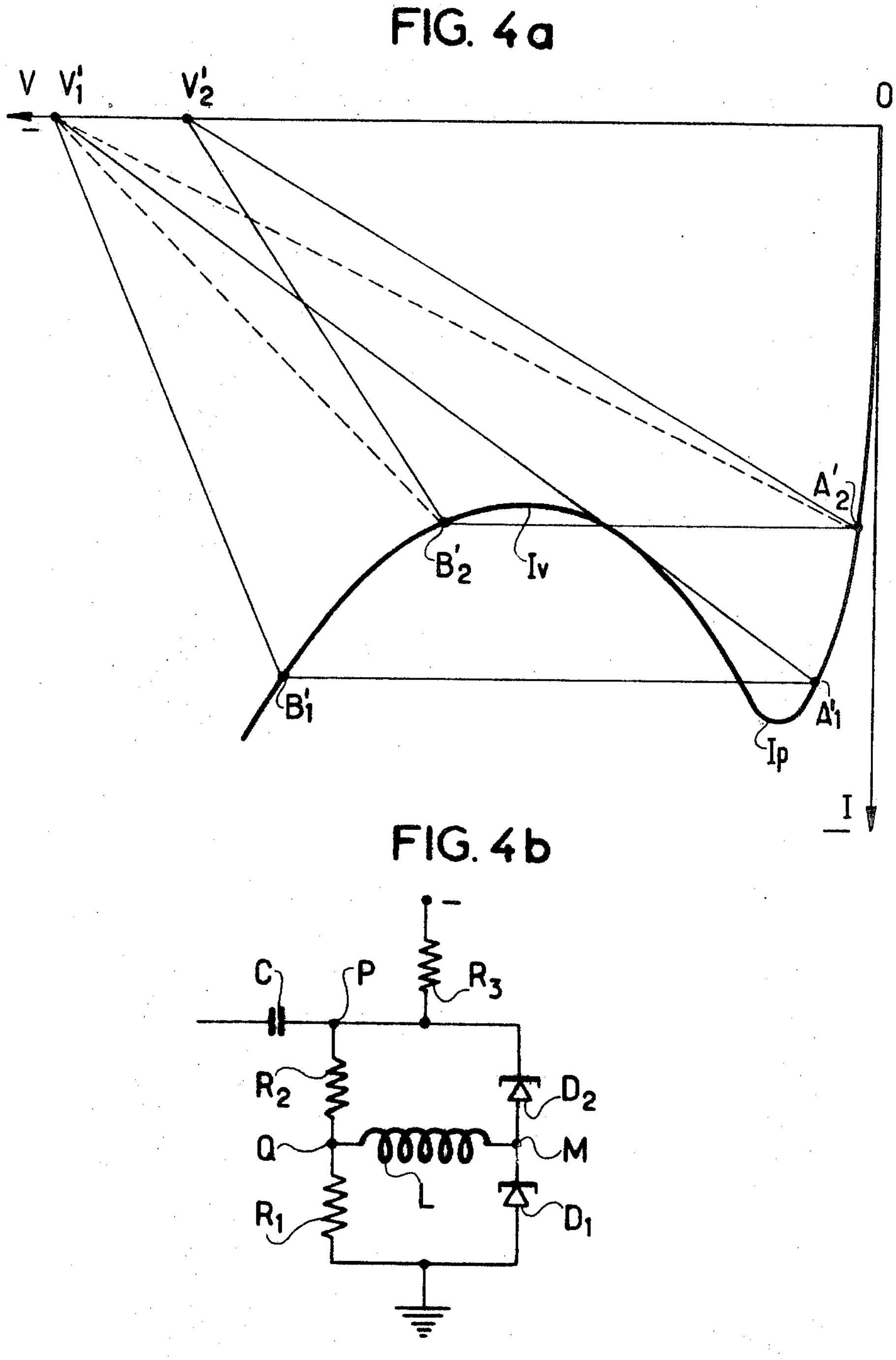

FIGS. **4*a* and 4*b* correspond to FIGS. 3*a* and 3*b***, with a diagram in which the supply voltages $V'_1$and $V'_2$ respectively are negative. The figurative points of the diodes are $A'_1$ and $B'_1$ for a strong bias current, and $A'_2$ and $B'_2$ for a low bias current. It will be seen that in the first case a changeover will occur for a negative input pulse, and in the second case for a positive input pulse.

The following table can thus be compiled, in which the polarity of the supply voltage, "bias" indicates the type of bias, strong (S) or low (L), "pulse" indicates the polarity of the triggering pulses, and "V" indicates the polarity of the supply voltage:

| | V | Bias | Pulse |
|---|---|---|---|
| (1) | + | S | + |
| (2) | + | L | − |
| (3) | − | S | − |
| (4) | − | L | + |

There will thus be obtained conditions of triggering by pulses of alternate polarities in a counter comprising a succession of stages of one of the following types:

| | | | | | |
|---|---|---|---|---|---|
| Line 1 | (1) | (2) | (1) | (2) | . . . |
| Line 2 | (1) | (3) | (1) | (3) | . . . |
| Line 3 | (2) | (4) | (2) | (4) | . . . |
| Line 4 | (3) | (4) | (3) | (4) | . . . |

For any one of these four combinations, the condition of alternation of polarity of the triggering pulses according to the invention is obtained. The useful differentiated pulse will also be utilized by inserting an inverting amplifier between identical flip-flops.

Figure 5:
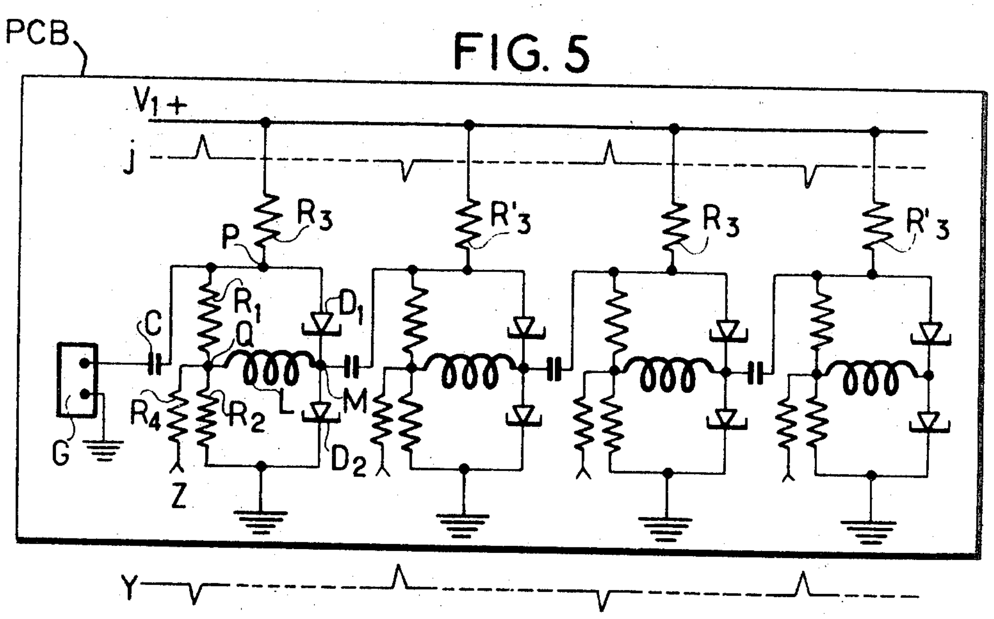
FIG. 5 is a diagram of a first embodiment of the invention given by way of example.
Figure 6:
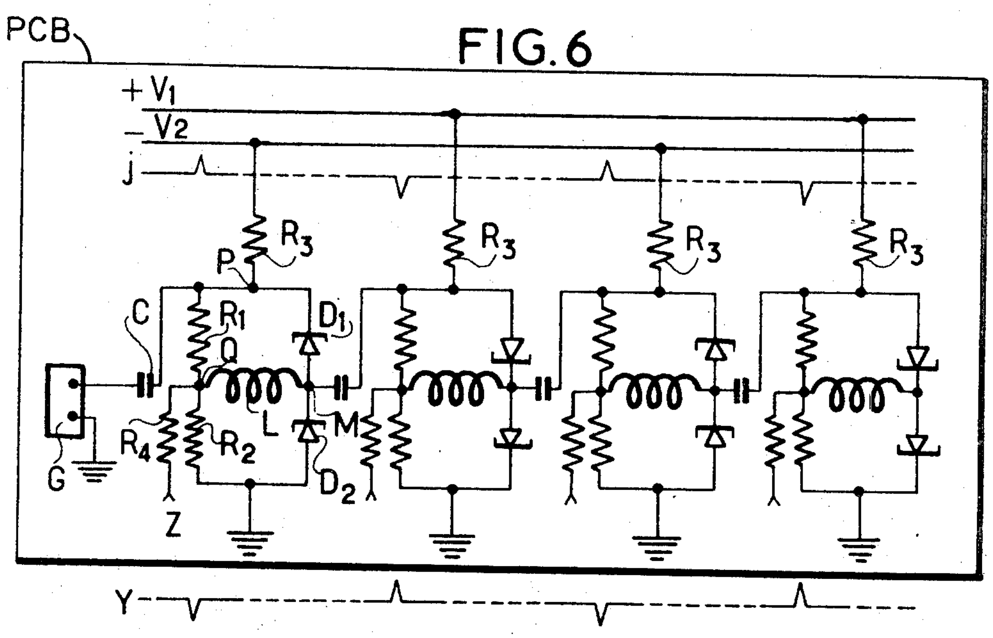
FIG. 6 is a diagram of a second embodiment of the invention.

FIG. 5 shows by way of example the basic diagram of a combination corresponding to the first line of the above table, while FIG. 6 gives a diagram corresponding to the second line.

In FIG. 5, which represents the diagram of four stages of a counter, there will be seen at each stage two tunnel diodes $D_1$, $D_2$ in series, which are in parallel with two resistances $R_1$, $R_2$ in series. The common low point of the network is connected to ground. The midpoint Q of the resistances is connected to the common point M of the diodes by an inductance L. Triggering pulses are applied by a capacitor C to a point P of each stage. The capacitor C of the first stage is connected to a pulse generator G, and that of the other stages is connected to the point M of the preceding stage.

In the stages of even order, the common high point P is connected to a potential source $V_1$ (for example $V_1$=0.6 V) by a resistance $R'_3$ (for example $R'_3$=68Ω).

In the stages of odd order, the common high point P is connected to the same potential source by a resistance $R_3$ (for example $R_3$=27Ω).

In each stage, the reset-to-zero pulses can be applied to the point Q by a terminal Z through a resistance $R_4$ (for example $R_4$=2ah*k*Ω). The state of the flip-flop can also be read by means of this resistance.

At each point P there has been marked the polarity of the triggering pulse *j*, which is alternately positive and negative. At each point Z, there has been marked the polarity of the reset-to-zero pulse Y, which is opposite to the polarity of the corresponding pulse *j*. These pulses Y are only sent when it is desired to reset the whole counter to the zero state.

In FIG. 6, the references have the same meanings as the corresponding references in FIG. 5. The voltages $V_1$ and $V_2$ are of alternate polarity (for example $V_1$=+0.6 V, $V_2$=−0.6 V), and the resistances $R_3$ have the same value in all the stages. There are again obtained here triggering pulses *j* of alternate polarity and reset-to-zero pulses Y of opposite polarity to the corresponding pulse *j*.

Generally speaking, it is always possible, for the purpose of obtaining optimum operation of a counter composed of a series of tunnel-diode flip-flops, to arrange the flip-flops in accordance with any of the following four configurations:

1. All the flip-flops have low bias current, with the same values of the components for all the flip-flops, and with alternation of the polarity of the voltage V between two consecutive flip-flops (case of FIG. 6).
2. All the flip-flops have high bias current, with the same values of the components for all the flip-flops, and with alternation of the polarity of the voltage V between two consecutive flip-flops.
3. All the flip-flops are fed with a positive voltage V, which may be the same in all cases, but then have alternately low and high values for the resistances $R_3$, which permits alternate operation with high and low bias current (case of FIG. 5).
4. All the flip-flops are fed with a negative voltage V which may be the same in all cases, but then have alternately low and high values for the resistance $R_3$, which permits alternate operation with high and low bias current.

For each of these configurations, the "zero" state of each flip-flop must be so chosen that the polarity of the reset-to-zero is the inverse of that of the useful pulse arriving at the flip-flop under consideration.

Figure 7:
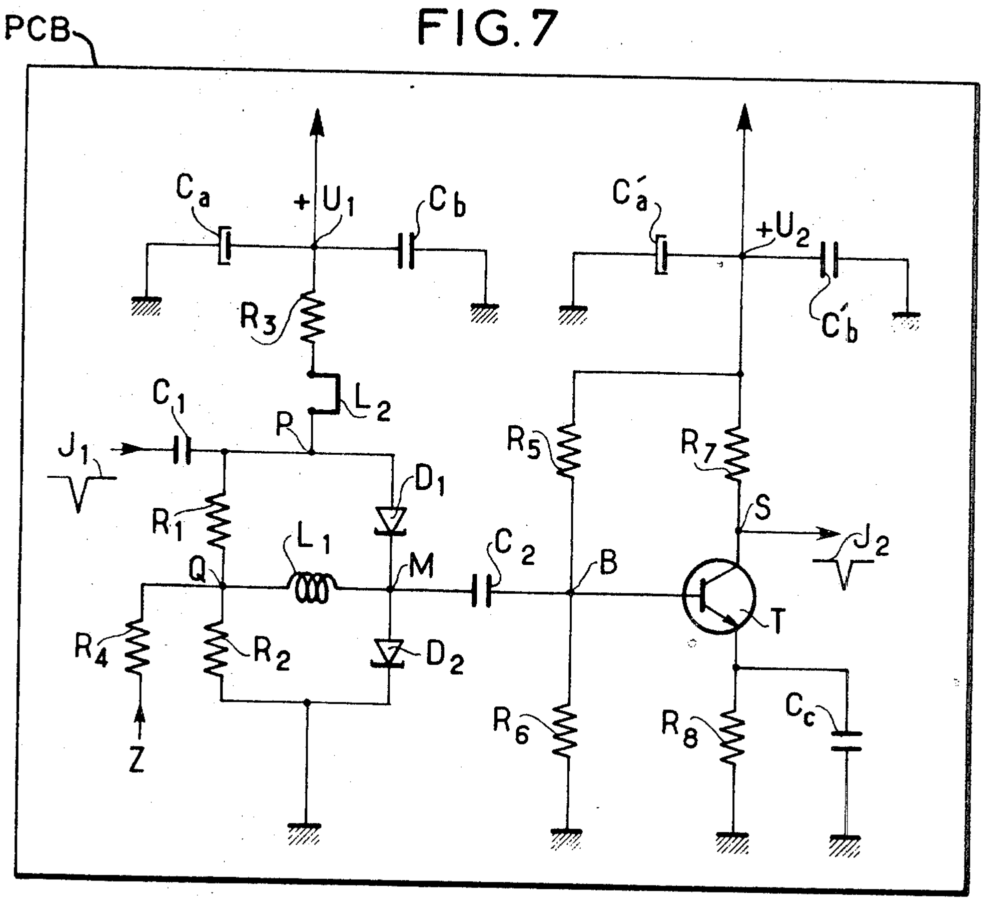
FIG. 7 is a diagram of a third embodiment of the invention.

In FIG. 7, the tunnel-diode flip-flop comprises two branches in parallel, one of which has two resistances $R_1$, $R_2$ in series, while the other contains two tunnel diodes $D_1$, $D_2$ in series. The midpoint Q of the first branch is connected to the midpoint M of the second branch by an inductance $L_1$. The lowermost point of the two branches is connected to ground, while the uppermost point P is connected to the terminal $+U_1$ of a supply source by an inductance $L_2$ in series with a resistance $R_3$. The point $+U_1$ is decoupled by two capacitors in parallel of which one, $C_a$, is of high value while the other $C_b$ is of low value.

The resistance $R_4$ transmits the erasure current under the effect of a pulse Z.

A negative input pulse $J_1$ may be applied to the point P through a capacitor $C_1$.

The point M is connected by a small capacitor $C_2$ to the base B of a transistor T, which is biased by two resistances $R_5$, $R_6$. This transistor T has its collector connected to a potential point $+U_2$ by a ballast resistance $R_7$. The point $+U_2$ is decoupled by two capacitors $C'_a$, $C'_b$.

The emitter of the transistor T is connected to ground by a resistance $R_8$, which is shunted by a capacitor $C_c$. The object of this network is to stabilize the current of the transistor.

The transistor supplies at the point S, which is connected to its collector, a negative output pulse $J_2$.

The inductance $L_1$ has a memory function. The inductance $L_2$ performs the function of a blocking impedance for the input pulse $J_1$. By avoiding a loss of energy contained in the input pulse into the unidirectional source, inductance $L_2$ increases the sensitivity of the flip-flop. In addition, this inductance must not be too high, because it tends to reduce the rate of change of the current supplied by the source, and therefore to limit the maximum counting rate. The optimum value of the inductance $L_2$, in a counter operating at 1000 mc./s. is of the order of a few tens of nanohenrys. The inductance $L_1$ is advantageously made about ten times as high.

In some cases, it will be advantageous to connect the inductance $L_2$ onto the second stage of the counter, which operates at half-frequency, the first stage not including this inductance.

It is very important for the resistances $R_1$, $R_2$, $R_5$, $R_6$, $R_7$ to have a series inductance which is as low as possible. Too high a residual inductance lowers the maximum speed of operation. In order to achieve this, all the resistances are of the type having a layer deposited upon a substrate, i.e. either a thin layer or a thick layer. The connections are of the printed circuit PCB in FIGS. 5, 6 and 7 type. On the other hand, the other active or passive components are of the discrete type. The whole thus constitutes a hybrid circuit.

In a particular arrangement, the specification of the circuit arrangement was as follows:

| | | | |
|---|---|---|---|
| $D_1$, $D_2$ | TD 253 B | | |
| T | 2 N 3633 | $C_1$ | 10 pf. |
| $R_1$, $R_2$ | 35Ω | $C_2$ | 4.7 pf. |
| $R_3$ | 40Ω | $U_1$ | +0.700 v. |
| $R_5$ | 2.7 k Ω | $U_2$ | +6 v. |
| $R_6$ | 400 Ω | | |
| $R_7$ | 560 Ω | | |

The proposed arrangement is only an example taken from a number of possible forms based on the principles set out in the foregoing.

Since the inverting amplifier transistor is biased to operate in Class AB or A, thus affording maximum gain, and the input and output connections are capacitive, it is possible to employ a PNP transistor as amplifier, and to bias it by means of adequate voltages.

The same arrangement is applicable to a tunnel-diode flip-flop operating with high bias current.

The inductance $L_2$ may advantageously be added to the arrangements of FIGS. 5 and 6.

While the invention has been particularly shown and described with reference to a preferred embodiment, it will be understood by those skilled in the art that the foregoing and other changes in form and details may be made therein without departing from the spirit and scope of the invention.

What I claim is:

1. A high-speed pulse counter comprising a plurality of stages of a first type and a plurality of stages of a second type all of said stages being arranged in cascade and alternating in type wherein
   a. each of said stages of said first type include a flip-flop means having two tunnel diodes in series for receiving a trigger pulse of a first polarity and emitting a triggering pulse of a second polarity,
   b. each of said stages of said second type includes a flip-flop means having two tunnel diodes in series for receiving a triggering pulse of said second polarity and emitting a pulse of said first polarity.

2. A pulse counter according to claim 12, wherein
   a. the flip-flop means of said stages of said first type includes supply terminals having a first voltage applied thereto and
   b. the flip-flop means of said stages of said second type includes supply terminals having a second voltage applied thereto, wherein one of the voltages provides a supply current which is in the neighborhood of the peak current drawn by one of said flip-flop means and the other voltage provides a current which is in the neighborhood of the valley current drawn by the other of said flip-flop means.

3. A pulse counter according to claim 2 wherein said first and second voltages are of opposite polarity.

4. A pulse counter according to claim 2 wherein said first and second voltages are of like polarity.

5. Pulse counter according to claim 12, wherein
   a. each flip-flop means of said stages of said first type is connected to a source of a first potential by a resistance of a first value, and
   b. each flip-flop means of said stages of said second type is connected to a source of a second potential, of the same polarity as the first source and of value differing from the first potential by 10 percent to 25 percent, by a resistance of value differing from the first value of said first resistance by 30 percent to 80 percent.

6. Pulse counter according to claim 12, wherein
   a. each flip-flop means of said stages of said first type is connected to a potential source by a resistance having a first value and
   b. each flip-flop means of said stages of said second type is connected to the same potential source by a second resistance having a value which differs from the first value of said first resistance by 60 percent to 144 percent.

7. Pulse counter according to claim 12, wherein
   a. each flip-flop means of said stages of said first type is connected to a first potential source by a first resistance, and
   b. each flip-flop means of said stages of said second type is connected to a bias potential source, whose polarity is opposite to that of said first source and which has approximately the same value, by a resistance of approximately equal value to the first resistance.

8. A high speed pulse counter having a plurality of identical stages in cascade, each stage comprising,
   a. a tunnel-diode flip-flop including two tunnel diodes in series and
   b. an inverting circuit connected to the output of said flip-flop, whereby the output of said flip-flop is inverted.

9. Pulse counter according to claim 8, wherein said flip-flop having two tunnel diodes is in series with
   b. said inverter circuit comprises a common emitter transistor, the output pulse being taken from the collector of said transistor by a resistance.

10. Pulse counter according to claim 8 wherein said tunnel-diode flip-flop is supplied power by a network containing a resistance in series with an inductance of the order of a nanohenry.